(12) United States Patent
Kitagishi et al.

(10) Patent No.: US 8,516,225 B2
(45) Date of Patent: Aug. 20, 2013

(54) CENTRAL PROCESSING UNIT AND MICROCONTROLLER

(76) Inventors: Koichi Kitagishi, Tokyo (JP); Masami Fukushima, Tokyo (JP)

(*) Notice: Subject to any disclaimer, the term of this patent is extended or adjusted under 35 U.S.C. 154(b) by 0 days.

(21) Appl. No.: 13/378,482

(22) PCT Filed: Nov. 22, 2011

(86) PCT No.: PCT/JP2011/076869
§ 371 (c)(1),
(2), (4) Date: Dec. 15, 2011

(87) PCT Pub. No.: WO2012/132104
PCT Pub. Date: Oct. 4, 2012

(65) Prior Publication Data
US 2012/0246445 A1    Sep. 27, 2012

(30) Foreign Application Priority Data
Mar. 25, 2011    (JP) ................. 2011-067931

(51) Int. Cl.
*G06F 9/32* (2006.01)
*G06F 9/318* (2006.01)
*G06F 13/16* (2006.01)

(52) U.S. Cl.
USPC .......................... 712/205; 712/210

(58) Field of Classification Search
None
See application file for complete search history.

(56) References Cited

U.S. PATENT DOCUMENTS

| | | | |
|---|---|---|---|
| 5,426,746 A * | 6/1995 | Sekiguchi | 712/227 |
| 5,487,133 A * | 1/1996 | Park et al. | 706/20 |
| 5,493,534 A * | 2/1996 | Mok | 365/185.33 |
| 5,504,903 A * | 4/1996 | Chen et al. | 713/1 |
| 5,784,636 A * | 7/1998 | Rupp | 712/37 |
| 6,314,504 B1* | 11/2001 | Dent | 711/212 |
| 6,317,822 B1* | 11/2001 | Padwekar | 712/209 |
| 6,567,910 B2* | 5/2003 | Tessarolo et al. | 712/227 |
| 7,206,924 B2* | 4/2007 | Boles et al. | 712/220 |
| 7,500,056 B2* | 3/2009 | Wheeler et al. | 711/118 |
| 8,281,109 B2* | 10/2012 | Valentine et al. | 712/209 |
| 2006/0095719 A1* | 5/2006 | Tsai | 712/34 |

FOREIGN PATENT DOCUMENTS

| | | |
|---|---|---|
| JP | 53-134336 | 11/1978 |
| JP | 04-040525 | 2/1992 |
| JP | 11-312084 | 11/1999 |
| JP | 2004-531837 | 10/2004 |
| JP | 2009-528597 | 8/2009 |

OTHER PUBLICATIONS

MIPS RISC Architecture ISBN 0-13-590472-2.

* cited by examiner

*Primary Examiner* — Eric Coleman
(74) *Attorney, Agent, or Firm* — Kratz, Quintos & Hanson, LLP

(57) ABSTRACT

A program data area 38 storing program data is provided in an internal memory unit that a control circuit 31 of a CPU 3 can directly red from. The program data is constituted by instructions each comprising an instruction information part and an operand (i.e., a complementary information part) for use in execution of this instruction information part. The program data area 38 comprises a plurality of 24-bit data areas each having an address indicative thereof. One instruction is stored in one data area such that the instruction information part resides at the beginning of the data area.

5 Claims, 9 Drawing Sheets

US 8,516,225 B2

1

CENTRAL PROCESSING UNIT AND MICROCONTROLLER

TECHNICAL FIELD

The present invention relates generally to a central processing unit and a microcontroller, and more particularly to a central processing unit incorporating a control circuit that reads a program data constituted by instructions that have instruction information part and complementary information part necessary to execute the instruction corresponding to the instruction information part, and runs the read program data, and to a microcontroller incorporating this central processing unit.

BACKGROUND ART

FIG. 4 illustrates by way of example a known state of the art microcontroller (hereafter referred to as μCOM). FIG. 4 is an exemplary configuration of a common 8-bit microcontroller. As shown in this figure, the μCOM 1 comprises an external memory unit 2 that stores a program data, and a central processing unit 3 (hereafter referred to as CPU) that reads instructions constituting the program data in a predetermined order and executes the instructions. The external memory unit 2 and the CPU 3 are connected to each other via an address bus $B_A$, a data bus $B_D$, and a control signal line L1.

The program data is constituted by the instructions. As shown in FIG. 5, the instructions may comprise a 1-byte instruction having instruction information part only, a 2-byte instruction having the instruction information part and one operand (i.e., complementary information part in the context of the invention) for execution of the instruction information part, and a 3-byte instruction having the instruction information part and two operands for execution of the instruction information part. The instruction information part and the operand are each configured as an 8-bit data.

As shown in FIG. 4, the external memory unit 2 comprises a plurality of 8-bit data areas each having an address from 0000H to an FFFFH in this order. One instruction information part or one operand is stored in one data area.

The 1-byte instruction is an instruction for which one read operation (of the instruction information part) is required for executing it such as copying data from the A register 33a to the B register 33b in the CPU 3. The 2-byte instruction is an instruction for which two rounds of read operation (of the instruction information part and one operand) is required for executing it such as adding the operand data to data stored in a register of the CPU 3. The 3-byte instruction is an instruction for which three rounds of read operation (of the instruction information part, a first operand, and a second operand) are required for executing it such as reading data from addresses in the external memory unit 2 designated by the two operands.

The CPU 3 comprises a control circuit 31 adapted for instruction analysis and arithmetic processing in accordance with the instruction analysis, an IR register 32, a register set 33, a first LATCHI register 34, a second LATCHI register 35, an address latch 36, and a program counter (hereafter referred to as PC) register 37. These elements are connected to each other via an internal bus Bin. The control circuit 31 controls the overall CPU 3 system, analyses the instruction information parts and executes the instructions. The ER register 32 is a register in which the instruction information part is stored.

The register set 33 comprises an A register 33a, a B register 33b, a C register 33c, a D register 33d, an E register 33e, an F register 33f, an H register 33h, and an L register 33l. These

2 registers are general registers for use in temporarily storing data in the course of arithmetic processing by the control circuit 31.

The first LATCHI register 34 is a register used to store the upper 8 bits residing at the address indicated by the operand, and the second LATCHI register 35 is a register used to store the lower 8 bits residing at the address indicated by the operand. The address latch 36 is a register used to specify the 16-bit address of the external memory unit 2 to be output on the address bus $B_A$.

The PC register 37 is a 16-bit register, content of which is output to the address latch 36, and output via the address bus $B_A$ to the external memory unit 2. The address stored in the PC register 37 is incremented each time the CPU 3 reads the instruction information part or the operand. In other words, the CPU 3 reads the instruction information part and the operand on a per address basis. Since the PC register 7 is reset to 0 upon resetting of the CPU 3, the CPU 3 will always start reading starting from the address 0000H of the external memory unit 2.

Next, the operation of the CPU 3 as shown in FIG. 4 is described with reference to FIGS. 6 to 9, in an illustrative case where the 3-byte instructions are stored at the address 0000H to address 0002H in the external memory unit 2.

First, the CPU 3 performs initialization upon being started up. In this initializing process, the control circuit 31 in the CPU 3 resets the PC register 37 to the address 0000H. Next, as shown in FIG. 6, the control circuit 31 outputs the address (address 0000H) stored in the PC register 37 to the address latch 36. Thus, the address 0000H is output to the external memory unit 2 via the address bus $B_A$. Next, the control circuit 31 outputs a read signal via the control signal line L1.

When the read signal is input to the external memory unit 2, the external memory unit 2 outputs data via the data bus $B_D$, the data residing at the address 0000H that has been input via the address bus $B_A$. Since the instruction information part resides at the address 0000H, the instruction information part is output via the data bus $B_D$ to the CPU 3. The control circuit 31 in the CPU 3 stores this instruction information part in the IR register 32, the instruction information part having been output via the data bus $B_D$.

Subsequently, as shown in FIG. 7, the control circuit 31 increments the PC register 37 so that the counter results in 0001H. Also, the control circuit 31 decodes the instruction information part stored in the IR register 32, and interprets that this instruction information part is an instruction to read data from the address in the external memory unit 2 specified by two operands and store the read data in the A register 33a.

It should be noted that there exist several hundreds or more types of instructions, some of which are illustrated by way of example.

Next, the control circuit 31 outputs the address (address 0001H) stored in the PC register 37 to the address latch 36. Thus, the address 0001H is output via the address bus $B_A$ to the external memory unit 2. Following this, the control circuit 31 outputs the read signal via the control signal line L1.

When the read signal is input, the external memory unit 2 outputs via the data bus $B_D$ the data stored at the address 0001H input via the address bus $B_A$. Since the operand is stored in the address 0001H, the operand will be output to the CPU 3 via the data bus $B_D$. The control circuit 31 stores in the second LATCHI register 35 the lower field at the address indicated by the operand output via the data bus $B_D$.

Subsequently, as shown in FIG. 8, the control circuit 31 increments the PC register 37 by 1 so that the counter results in 0002H. Next, the control circuit 31 outputs the address (address 0002H) stored in the PC register 37 to the address latch 36. Thus, the address 0002H is output to the external memory unit 2 via the address bus $B_A$. Following this, the control circuit 31 outputs the read signal via the control signal line L1.

When the read signal is input, the external memory unit 2 outputs the data stored at the address 0002H input from the address bus $B_A$ via the data bus $B_D$. Since the operand is store at the address 0002H, the operand will be output via the data bus $B_D$ to the CPU 3. The control circuit 31 in the CPU 3 stores the upper filed in the address indicated by the operand output via data bus $B_D$ in the first LATCHI register 34.

Subsequently, the control circuit 31 increments the PC register 37 by 1, so that it results in 0003H as shown in FIG. 9. Next, the control circuit 31 output the address stored at the first and second LATCHI registers 34, 35 to the address latch 36. Thus, the address specified by the two operands is output via the address bus $B_A$ to the external memory unit 2. Next, the control circuit 31 outputs the read signal via the control signal line L1.

When the read signal is input, the external memory unit 2 outputs the data residing at the address input by the address bus $B_A$, outputs it via the data bus $B_D$. The control circuit 31 in the CPU 3 stores the data output via the data bus $B_D$, stores it in the A register 33a, and thus the operation for one instruction is completed.

After that, the control circuit 31 outputs the address (0003H address) stored in the PC register 37 to the address latch 36, and reads the next instruction in the IR register 32, decodes it, executes it, and this operation is repeated.

Since the CPU 3 is not capable of directly reading the instruction information part and the operand stored in the external memory unit 2, the CPU 3 needs to store the instruction information part and the operand originally stored in the external memory unit 2 in the internal registers 32, 33a to 33l, 34, and 35 from which data can be directly read by the CPU 3.

Accordingly, the CPU 3 of the μCOM 1 needs to perform instruction-read operation one time for 1-byte instruction, twice for 2-byte instruction, and three times for 3-byte instruction, the instruction-read operation including outputting the address via the address bus $B_A$, outputting the read signal via the control signal line L1, storing the instruction information part or the operand via the data bus $B_D$ temporarily in the registers 32, 33a to 33l, 34, and 35 for reading thereof. This implies that reading of the instructions takes much time.

Also, reading and writing of the data by the CPU 3 to and from the external memory unit 2 are performed as described below. Specifically, with regard to reading of data from the external memory unit 2, as described in the foregoing, after the CPU 3 has output the address to be read to the address bus $B_A$, the CPU 3 outputs the read signal. When the read signal is input, the external memory unit 2 outputs the data stored at the address input via the address bus $B_A$, outputs it via the data bus $B_D$. Meanwhile, with regard to w2riting of data in the external memory unit 2, the CPU 3 outputs the address for writing via the address bus $B_A$ and outputs the data for writing via the data bus $B_D$, and subsequently outputs the write signal. The external memory unit 2, when the write signal is input, stores the data input from the data bus $B_D$ at the address input via the address bus $B_A$.

SUMMARY OF THE INVENTION

Technical Problem

However, since the μCOM 1 uses a single data bus $B_D$ for both outputting of the read data and outputting of the write data, write operation and read operation cannot take place simultaneously. Also, since it is necessary to output the read signal and the write signal from the CPU 3 to the external memory unit 2, the external memory unit 2 has to read these signals and then perform reading and writing. Thus, reading and writing take much time.

In view of the above-identified problem, an object of the present invention is to provide a central processing unit and a microcontroller that achieves higher processing speed.

Solution to Problem

As solution to the above-identified problems, one aspect of the claimed subject matter provides a central processing unit comprising a control circuit reads and executes a program data that comprises instructions including instruction information part and complementary information part necessary to execute the instruction information part.

The internal memory unit includes a plurality of data areas each having a predetermined capacity and an address, the internal memory unit being configured to be directly read from by the control circuit.

The instructions are stored in the data areas on a one-to-one basis and the instruction information parts are stored in same locations at or away by a prescribed degree from beginning of the corresponding data areas.

The program data is stored in the internal memory prior to start-up of the central processing unit such that the variable-length instructions are in accordance with storage format of the internal memory unit.

Another aspect of the claimed subject matter (see FIG. 3) provides a microcontroller that comprises (a) the central processing unit of claim 1 and (b) an external memory unit connected to the central processing unit via an address bus and a data bus.

The address bus includes a read address bus and a write address bus, and the data bus includes a read data bus and a write data bus.

The central processing unit is configured to output, on the read address bus, an address at which a read data to be read is stored so as to read the read data from the external memory unit. The central processing unit is also configured to output, on the write address bus, another address at which a write data is to be written in the external memory, and output the write data on the write data bus so as to write the write data into the external memory unit.

The external memory unit is configured to output the read data on the read data bus, the read data residing at the address that has been input via the read address bus into the external memory unit. The external memory unit is also configured to write the data that has been input via the write data bus into the external memory at the other address that has been input via the write address bus.

Advantageous Effects of the Invention

As has been summarized above, according to the first aspect of the claimed subject matter, the program data is stored in the internal memory unit that the control circuit can directly read from. The program data area comprises the data areas each having the predetermined capacity and the address with one instruction is stored in the corresponding one data area. Since the instruction information parts are stored at the beginning fields of the data area or at a field away from the beginning to a predefined extent from the data areas, the beginning fields can serve as an IR register.

Accordingly, the IR register do not need to be provided, so that the instruction analysis can be implemented for the instruction information parts without sending the instruction information parts to the IR register. Specifically, reading of the instruction can be performed without placing the instruction information part and the complementary information parts stored in the external memory unit in the IR register that can be directly read from by the control circuit, which contributes to higher processing speed. Also, one instruction can be executed upon one round of incrementing of the program counter, which further increases the processing speed.

According to the second aspect of the claimed subject matter, the address bus is constituted by the read address bus and the write address bus, and the data bus is constituted by the read data bus and the write data bus. Accordingly, write operation and read operation can be done simultaneously to/from the external memory unit. Moreover, the CPU does not need to output a read signal or a write signal, which ensures higher processing speed.

DESCRIPTION OF EXEMPLARY EMBODIMENTS

First Embodiment

Figure 1:
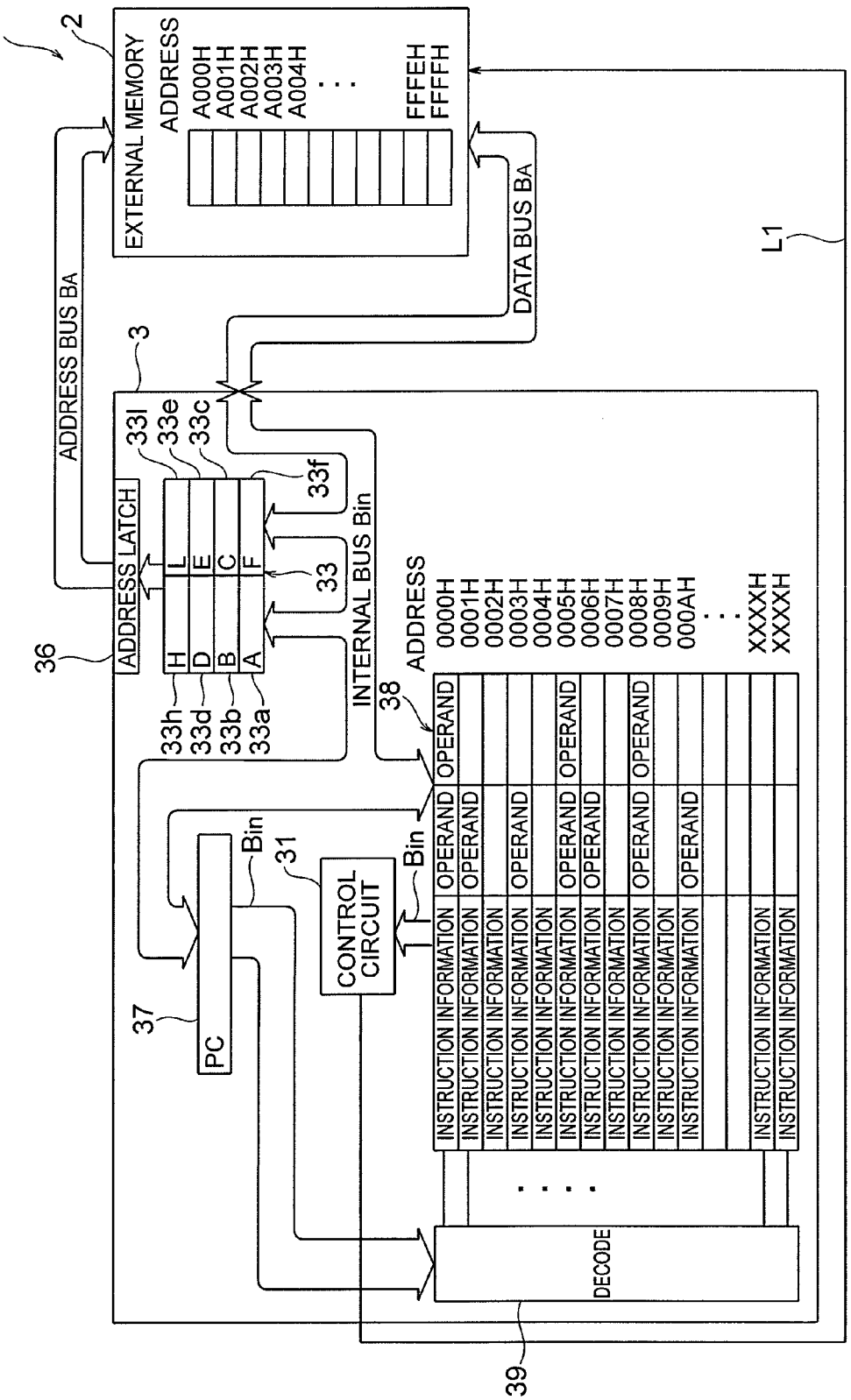
FIG. 1 is a block diagram of a μCOM incorporating a CPU according to a first embodiment of the present invention.

A central processing unit (hereafter referred to as CPU) and a microcontroller (hereafter referred to as μCOM) according to a first embodiment of the present invention are described below with reference to FIG. 1. As shown in this figure, the μCOM 1 comprises an external memory unit 2 and a CPU 3 that reads instructions in a predetermined order and executes the instructions, the set of instructions constituting a program data. The external memory unit 2 and the CPU 3 are connected to each other via an address bus $B_A$, a data bus $B_D$, and a control signal line L1.

The external memory unit 2 comprises a plurality of eight-bit data areas indicated by addresses A000H to FFFFH in this order.

The program data, which comprises the instructions, is stored in a program data area 38 incorporated in the CPU 3, the program data area 38 serving as an "internal memory unit" in the context of the invention.

The instructions have variable lengths including a 1-byte instruction that only contains an operation code (i.e., an "instruction information part" in the context of the invention); a 2-byte instruction comprising (i) the instruction information part and (ii) one operand (i.e., complementary information part in the context of the invention) used to execute the content of the instruction information part; and a 3-byte instruction comprising the instruction information part and two operands used to execute the content of the instruction information part. The instruction information part and the operands are each configured as an 8-bit data.

The CPU 3 comprises a control circuit 31 configured for instruction analysis and arithmetic processing in accordance with the instruction analysis; the program data area 38; a register set 33; an address latch 36; a program counter (PC) register 37; and a decode unit 39, which are connected to each other via an internal bus Bin. The control circuit 31 controls the entire CPU 3, analyzes the content of the instruction information parts and executes the instructions.

The program data area 38 comprises a plurality of 24-bit data areas each indicated by addresses 0000H to XXXXH in this order such that one data area only stores one instruction. The instruction information parts are stored in the individual data areas on a one-to-one basis. Specifically, the instruction information parts are stored in the same fields at the beginning of the data areas or away from the beginning thereof to a prescribed extent, respectively.

Accordingly, in the case of the 1-byte instruction, the instruction information part is stored in the first 8-bit field of the individual data area, and the following 16 bits are blank bits. Likewise, in the case of the 2-byte instruction, the first 8-bit field stores the instruction information part, the next 8-bit field stores the operand, and the remaining 8 bits are blank bits. Also, in the case of the 3-byte instruction, the first 8-bit field of the data area stores the instruction information part, the next 8-bit field stores the operand, and the remaining 8-bit fields stores another operand. The program data area 38 is an "internal memory unit" in the context of the invention which the control circuit 31 can directly read from.

The register set 33 comprises an A register 33a, a B register 33b, a C register 33c, a D register 33d, an E register 33e, an F register 33f, an H register 33h, and an L register 33l, which are general registers configured as 8-bit registers temporarily storing data in the course of arithmetic processing in the control circuit 31.

The address latch 36 is a register used to specify an address to be output on the address bus $B_A$, the address being a 16-bit address in the external memory unit 2.

The PC register 37 is also a 16-bit register. The control circuit 31 reads the instruction from the program data area 38 where the instruction is stored and executes this instruction, the instruction being specified by the address indicated by the PC register 37. The address stored in the PC register 37 is incremented by 1 each time the control circuit 31 reads one instruction. In other words, the CPU 3 reads the instructions on a per address basis in a sequential manner. Since the PC register 37 is reset to 0 upon resetting of the CPU 3, the CPU 3 will always start read operation starting from the address 0000H.

The decode unit 39 outputs the beginning 8 bits (i.e., the instruction information part) on the internal bus Bin connected to the control circuit 31, the beginning 8 bits being stored in the location indicated by the specific address in the program data area 38, the specific address being specified by the PC register 37.

Next, operation of the CPU 3 is described with reference to FIG. 2 in the case where, as shown in FIG. 1, a 3-byte instructions stored in the location indicated by the address 0000H in the program data area 38 in the CPU 3.

First, upon being started up, the CPU 3 performs initialization. In this initializing process, the control circuit 31 in the CPU 3 resets the PC register 37 to the address 0000H. The decode unit 39 outputs the first 8 bits (i.e., the instruction information part) at the address in the program data area 38 (i.e., the address 0000H) specified by the PC register 37, the first 8 bits being output on the internal bus Bin connected to the control circuit 31.

Figure 2:
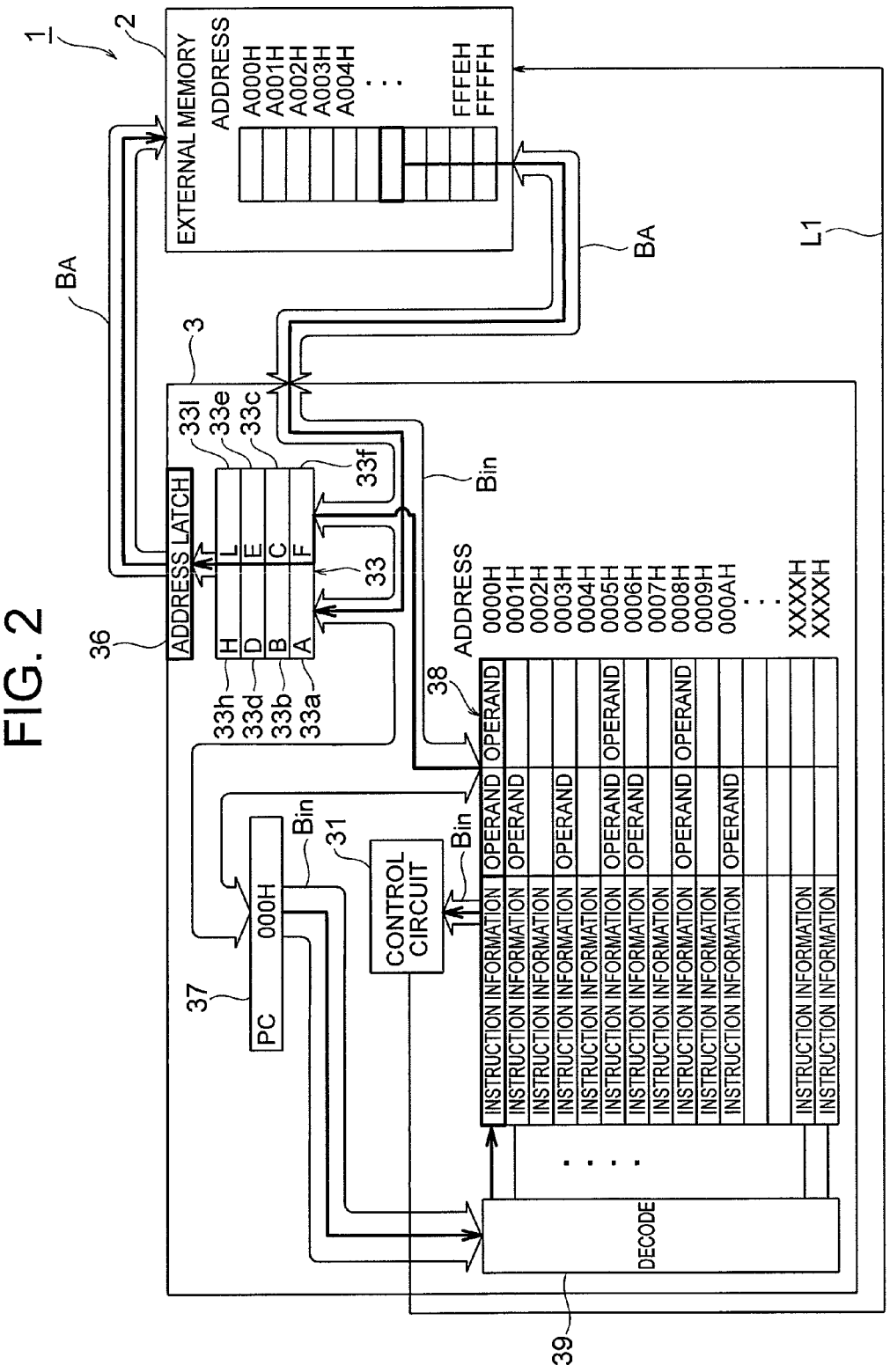
FIG. 2 illustrates the operation of the μCOM shown in FIG. 1.

After that, as shown in FIG. 2, the control circuit 31 decodes the instruction information part indicated by the 8 bits at the address (address 0000H) that has been output on the internal bus Bin, and judges that this instruction information part pertains to the instruction instructing to read data from locations indicated by the two addresses in the external memory unit 2 specified by the two operands and store the data in the A register 33a.

Further, the control circuit 31 outputs the two operands, which are stored in the remaining 16 bits at the address 0000H, to the address latch 36. Thus, the addresses designated by the two operands are output via the address bus $B_A$ to the external memory unit 2. Following this, the control circuit 31 outputs a read signal via the control signal line L1.

When the read signal is input to the external memory unit 2, the external memory unit 2 outputs the data via the data bus $B_D$, the data being stored in the location indicted by the address that has been input via the address bus $B_A$. The control circuit in the CPU 3 stores the data output via the data bus $B_D$ in the A register 33a, and thus operation for one instruction is completed.

Subsequently, the control circuit 31 increments the PC register 37 by 1, so that the counter results in 0001H. In response to this, the control circuit 31 decodes the instruction information part stored in the first 8 bits at the address (address 0001H) stored in the program data area 38, and the above operation will be repeated.

In accordance with the above-described CPU 3, the program data is stored in the program data area 38, the program data area 38 being the internal memory unit in CPU 3 that can be directly read from by the control circuit 31. The program data area 38 comprises the data areas each having the predetermined capacity and the address with one instruction is stored in the corresponding one data area. Since the instruction information parts are stored at the beginning fields of the data areas, the beginning fields can serve as an IR register.

Accordingly, the IR register do not need to be provided, so that the instruction analysis can be implemented for the instruction information parts without sending the instruction information parts to the IR register. Specifically, reading of the instruction can be performed without placing the instruction information part and the complementary information parts stored in the external memory unit in the IR register that can be directly read from by the control circuit, which leads to higher processing speed. Also, one instruction can be executed upon one round of incrementing of the program counter, the processing speed can be further increased.

Although the program data area 38 of the first embodiment comprises the 24-bit data areas with one instruction stored in one data area on a one-to-one basis, the invention is not limited to this specific configuration. For example, the program data area 38 may comprise 8-bit data areas with one instruction information part or one operand stored in one data area at one address.

Also, the invention is not limited to the configuration of the above-described first embodiment, where the instruction information part is stored at the beginning field in the data area. The instruction information part may be stored at the same field spaced apart from the beginning of the data area. For example, the instruction information part may be stored in the last 8 bits in the data area, or may be stored in a field 8 bits away from the beginning of the data area.

Second Embodiment

Figure 3:
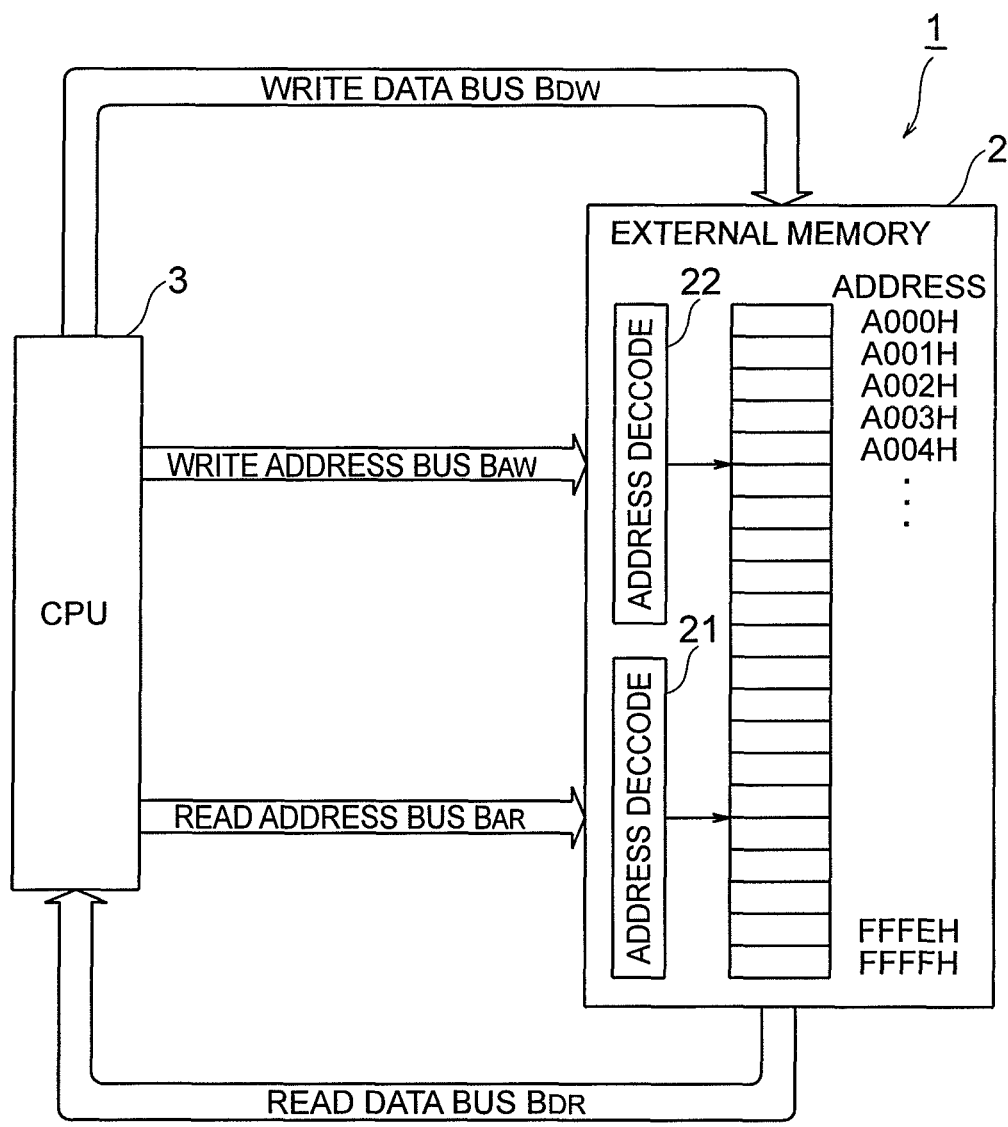
FIG. 3 is a block diagram of the μCOM according to a second embodiment of the present invention.

Next, a second embodiment of the present invention is described with reference to FIG. 3. In FIG. 3, the same or like elements are indicated by the same reference signs as used in the context of the first embodiment of FIG. 1, whose detailed explanation will not be repeated here. As shown in this figure, the μCOM 1 comprises an external memory unit 2 and a CPU 3. The external memory unit 2 and the CPU 3 are connected to each other via a read address bus $B_{AR}$, a write address bus $B_{AW}$, a read data bus $B_{DR}$, and a write data bus $B_{DW}$.

The external memory unit 2 comprises, in the same manner as in the first embodiment, a plurality of 8-bit data areas each having the addresses A000H to FFFFH in this order. Also, the external memory unit 2 includes an address decoder circuit 21 for read operation and an address decoder circuit 22 for write operation. An address output via the read address bus $B_{AR}$ in input to the address decoder circuit 21 for read operation. Also, an address output via the write address bus $B_{AW}$ is input to the address decoder circuit 22 for write operation.

The address decoder circuit 21 for reading operation is a circuit adapted to connect the data area having the address, which has been input via the read address bus $B_{AR}$, to the read data bus $B_{DR}$ and output data stored in this data area via the read data bus $B_{DR}$ to the CPU 3. The address decoder circuit 22 for write operation is a circuit adapted to connect the data area having the address, which has been input via the write address bus $B_{AW}$, to the write data bus BRW and write the data output on the write data bus BRW into this data area. Detailed description of the CPU 3 is omitted, for it has the same configuration as that in the first embodiment.

Next, the read and write operations by the μCOM 1 is described below.

First, when a read data has been created, the read data being a data that needs to be read by the CPU 3, the CPU 3 outputs an address of the read data on the read address bus $B_{AR}$. In response to outputting of this address, the external memory unit 2 outputs the read data residing at the address that has been specified via the read address bus $B_{AR}$, the read data being output on the read data bus $B_{DR}$. The CPU 3 then reads the read data that has been output on the read data bus $B_{DR}$.

On the other hand, when a write data is created, the write data being a data that needs to be written in the external memory, the CPU 3 outputs the write data on the write data bus $B_{DW}$. Subsequently, the CPU 3 outputs another address at which the write data resides on the write address bus $B_{AW}$ in the form of a one-shot pulse. In response to this one-shot pulse, the address decoder circuit 22 for write operation writes the write data, which has been output on the write data bus $B_{DW}$, into the location indicated by the other address specified via the write address bus $B_{AW}$.

In accordance with the above-described second embodiment, the address bus is constituted by the read address bus $B_{AR}$ and the write address bus $B_{AW}$, and the data bus is constituted by the read data bus $B_{DR}$ and the write data bus $B_{DW}$.

Further, when the CPU 3 reads data from the external memory unit 2, the address at which the read resides is output on the read address bus $B_{AR}$, and when the write data is to be written to the external memory unit 2, the other address at which this data is to be written is output on the write address bus $B_{AW}$, and the write data as such is output on the write data bus $B_{DW}$.

When the address is input to the external memory unit 2 via the read address bus $B_{AR}$, the data residing at the address is output on the read data bus $B_{DR}$. When the other address is input via the write address bus $B_{AW}$, the data that has been input via the write data bus $B_{DW}$ is written into the location indicated by the address that has been input via the write address bus $B_{AW}$.

Accordingly, write operation and read operation to/from the external memory unit 2 can be done simultaneously. Moreover, since the CPU 3 does not need to output a read signal or a write signal, higher processing speed can be achieved.

Alternative Illustrative Example

Figure 4:
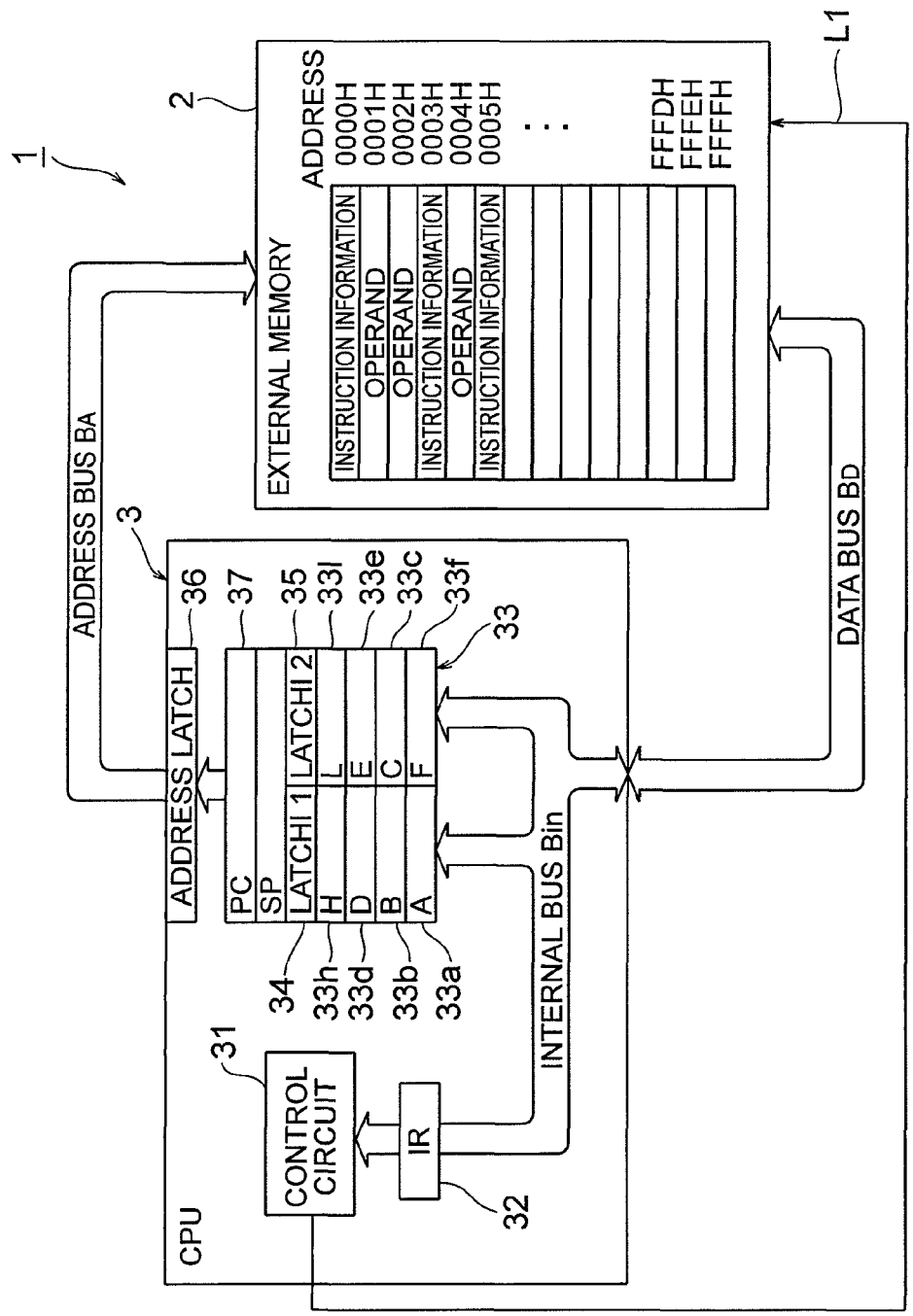
FIG. 4 is a block diagram of an example of a conventional μCOM.
Figure 5:
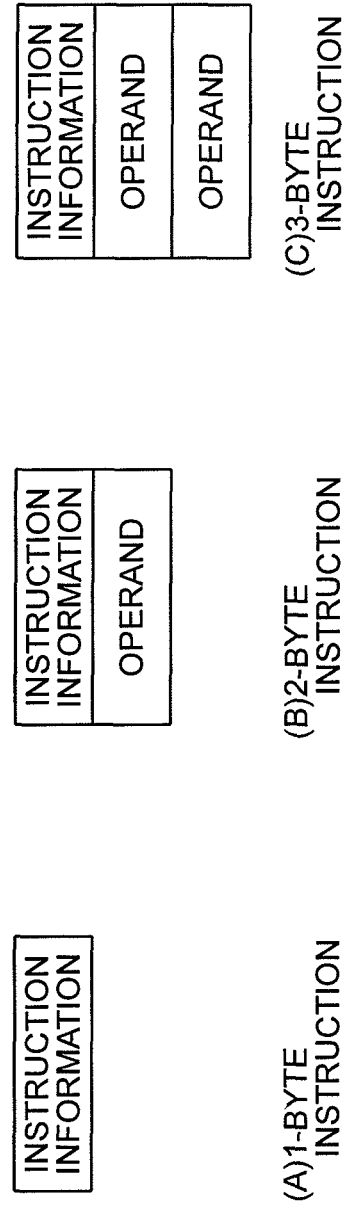
FIG. 5 illustrates the configuration of the instruction executed by the CPU shown in FIG. 4.
Figure 6:
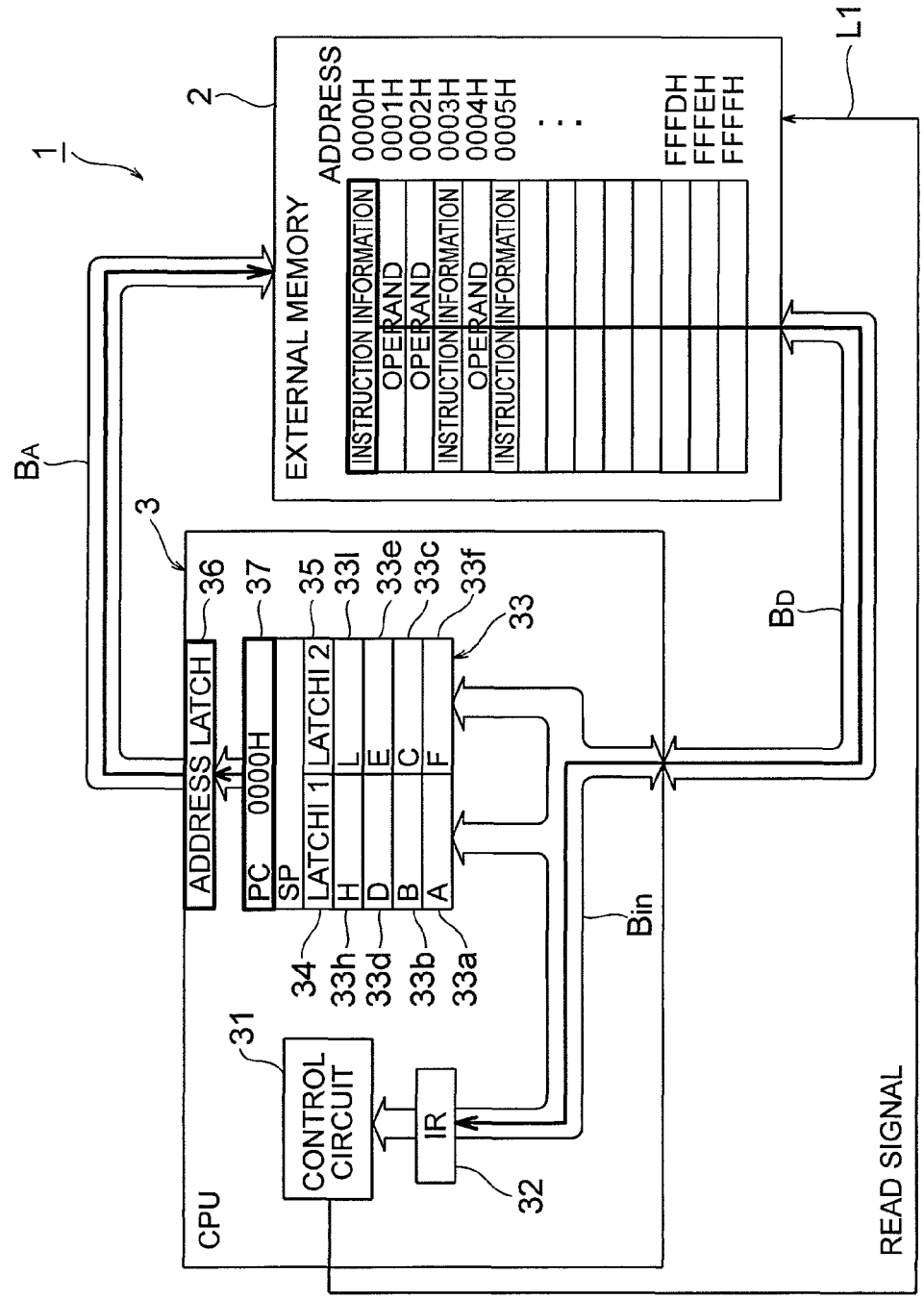
FIG. 6 illustrates operation of the μCOM shown in FIG. 4.
Figure 7:
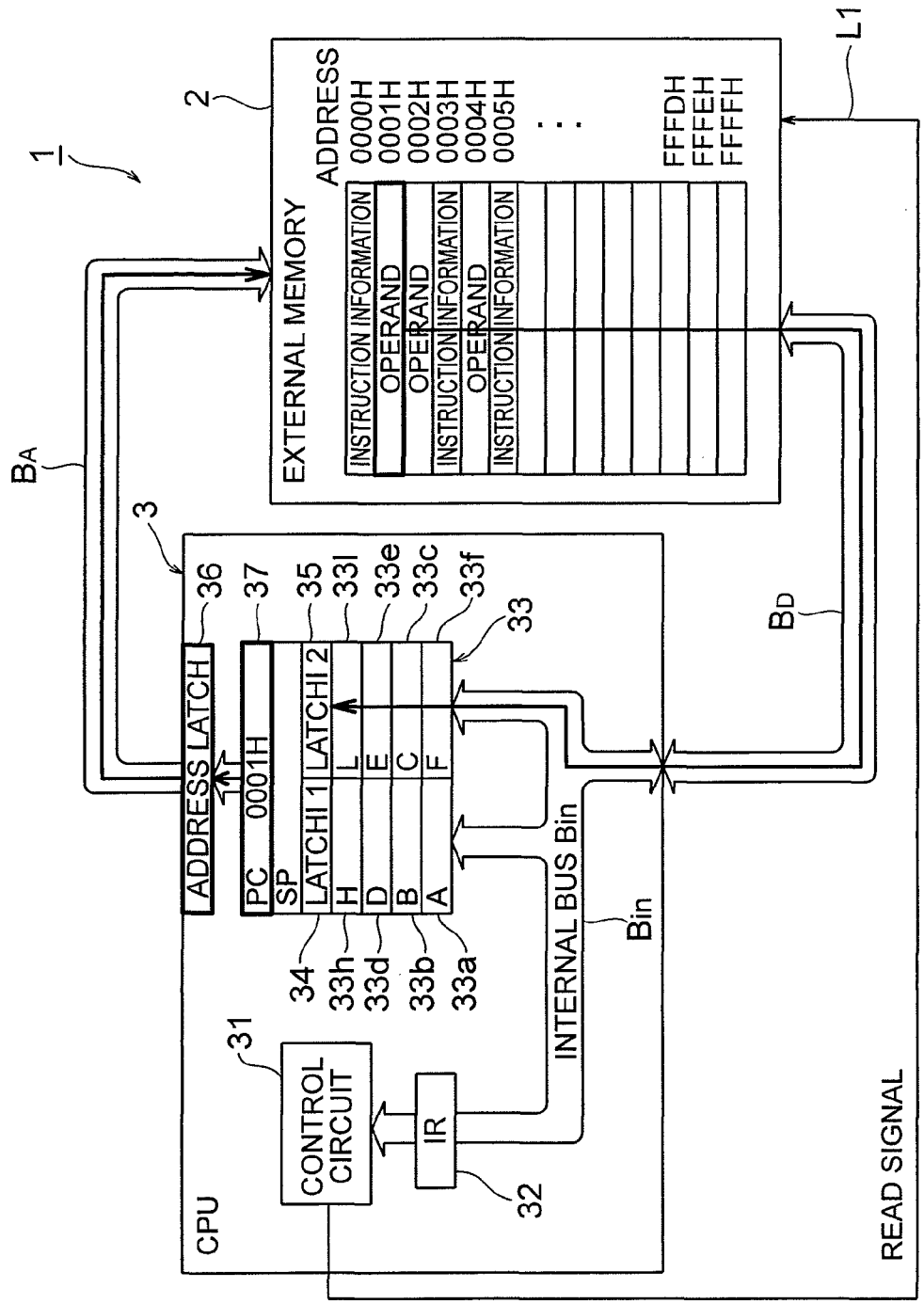
FIG. 7 illustrates operation of the μCOM shown in FIG. 4.
Figure 8:
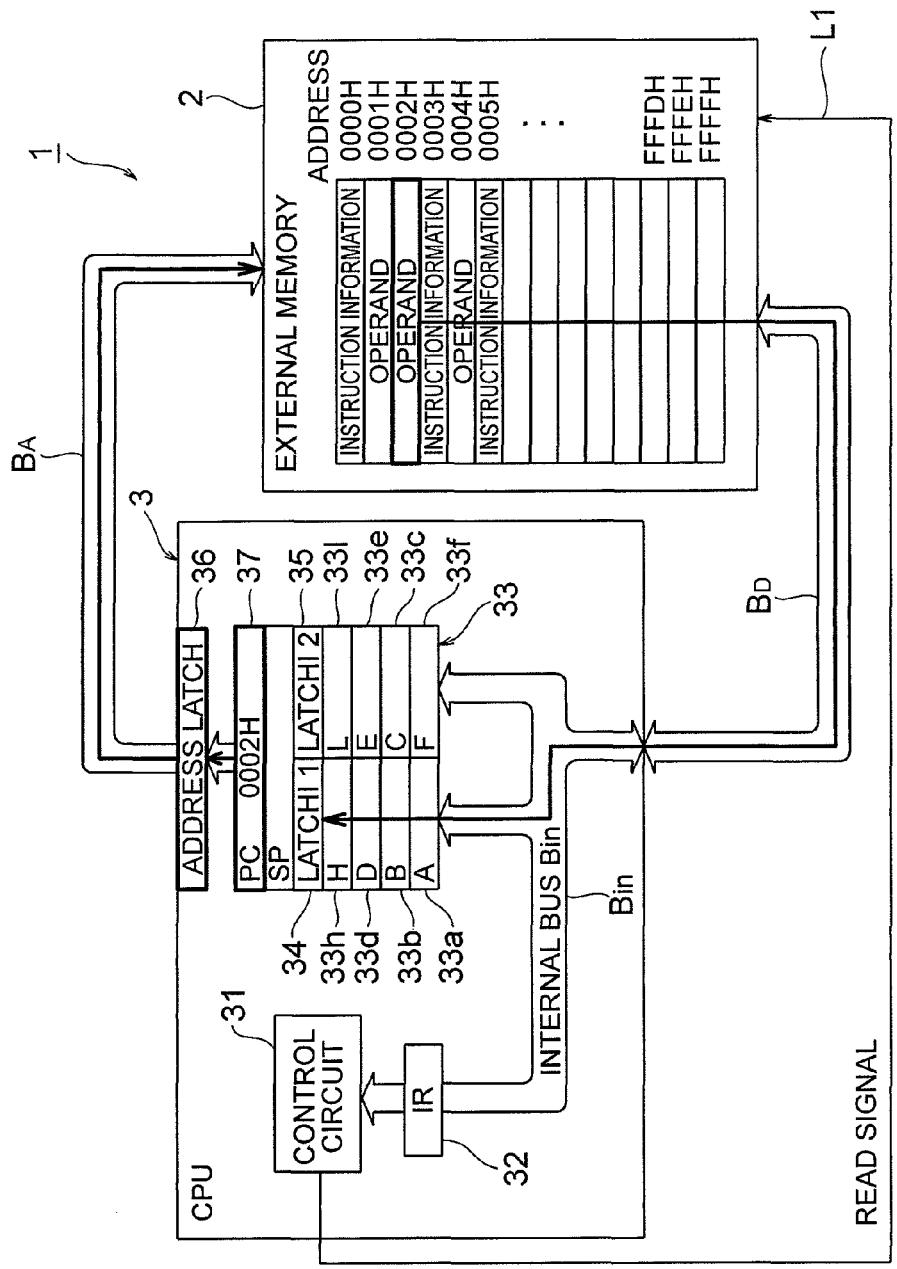
FIG. 8 illustrates operation of the μCOM shown in FIG. 4.
Figure 9:
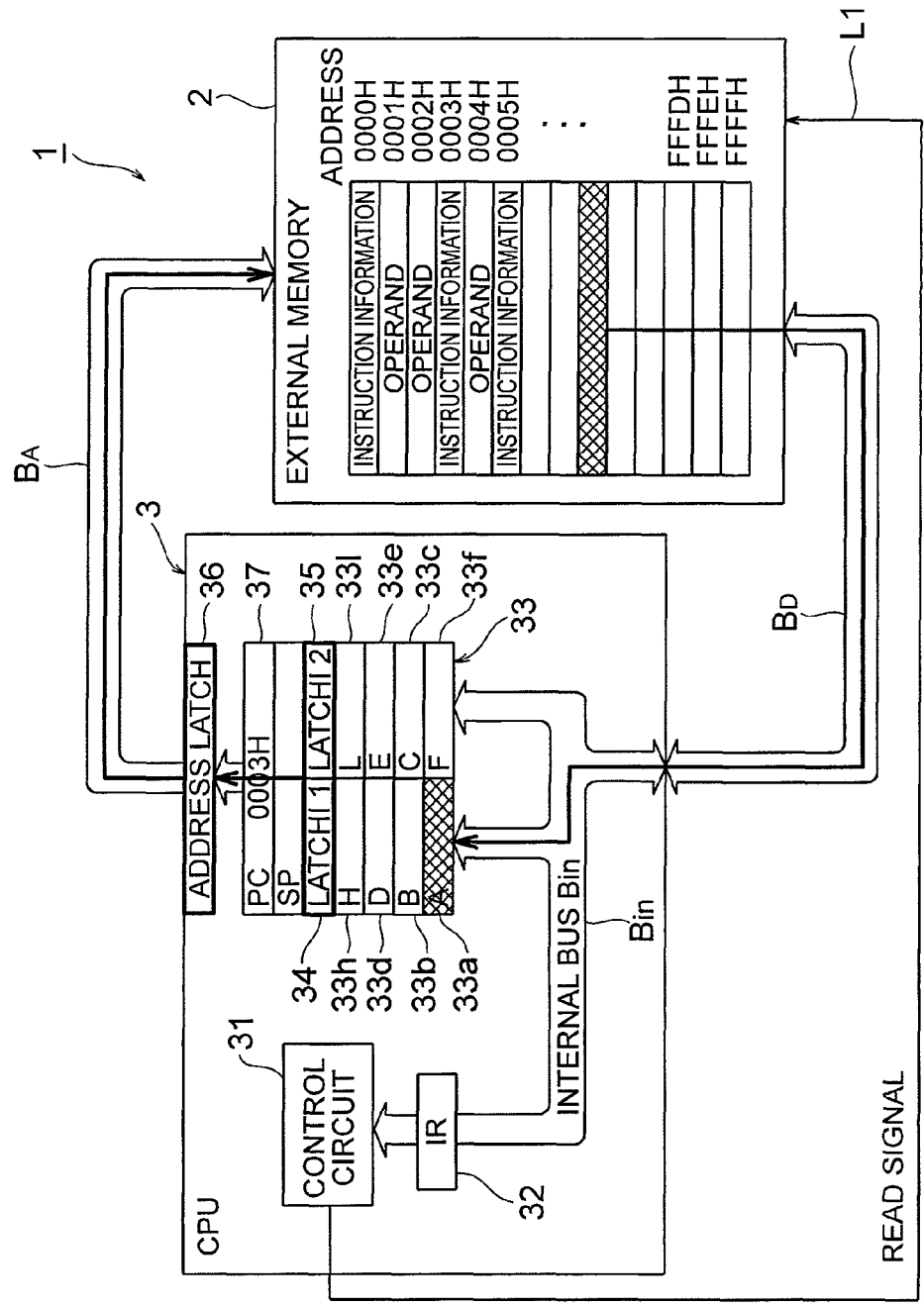
FIG. 9 illustrates operation of the μCOM shown in FIG. 4.

Although the same CPU is used in the first and second embodiments, the CPU 3 may have the state of the art common configuration shown in FIG. 4.

The illustrated embodiments of the present invention have been described for illustrative purposes only, and not by way of limiting the invention. Accordingly, the present invention can be implemented with various modifications made thereto within the scope of the present invention.

REFERENCE SIGNS

1 μCOM (microcontroller)
2 External memory unit
3 CPU (central processing unit)
31 CPU
$B_{AR}$ Read address bus
$B_{AW}$ Write address bus
$B_{DR}$ Read data bus
$B_{DW}$ Write data bus

The invention claimed is:

1. A central processing unit, comprising a control circuit for reading a program data from an internal memory unit and executing the program data, the program data being variable-length instructions that include an instruction information part and a complementary information part for execution of the instruction information part, wherein: (A) the internal memory unit includes a plurality of data areas each having a predetermined capacity and an address, the internal memory unit being directly read by the control circuit, (B) the instructions are stored in the data areas on a one-to-one basis and the instruction information parts red in same locations at or away from a predefined extent from beginning of the corresponding data areas, and (C) the program data is pre-stored in the internal memory unit prior to start-up of the central processing unit such that the variable-length instructions are in accordance with storage format of the internal memory unit.

2. A microcontroller comprising:
(a) the central processing unit of claim 1; and
(b) an external memory unit connected to the central processing unit via an address bus and a data bus, the address bus including a read address bus and a write address bus; the data bus including a read data bus and a write data bus; the central processing unit being configured to output, on the read address bus, an address at which a read data to be read is stored so as to read the read data from the external memory unit; the central processing unit being configured to output, on the write address bus, another address at which a write data is to be written in the external memory, and output the write data on the write data bus so as to write the write data into the external memory unit; the external memory unit being configured to output the read data on the read data bus, the read data residing at the address that has been input via the read address bus into the external memory unit; and the external memory unit being configured to write the data that has been input via the write data bus into the external memory at the other address that has been input via the write address bus.

3. The central processing unit according to claim 1, wherein the control unit is connected via internal bus to the internal memory unit so that the internal memory unit is directly read by the control circuit.

4. The central processing unit according to claim 1, wherein the control unit uses as an IR register beginning fields of the data areas of the internal memory unit so as to directly read the internal memory unit.

5. The central processing unit according to claim 1, wherein one instruction can be executed upon one round of increasing of a PC register.

* * * * *